March 26, 1968 E. FELDTKELLER 3,375,091

STORER WITH MEMORY ELEMENTS BUILT UP OF THIN MAGNETIC LAYERS

Filed March 17, 1965 2 Sheets-Sheet 1

INVENTOR
ERNST FELDTKELLER

ATTORNEYS

INVENTOR
ERNST FELDTKELLER

Spiel & Spiel ATTORNEYS 3,375,091

STORER WITH MEMORY ELEMENTS BUILT UP OF THIN MAGNETIC LAYERS

Ernst Feldtkeller, Munich, Germany, assignor to Siemens Aktiengesellschaft, a corporation of Germany Filed Mar. 17, 1965, Ser. No. 440,646
Claims priority, application Germany, Mar. 17, 1964, S 90,051; May 25, 1964, S 91,223
11 Claims. (Cl. 29—194)

ABSTRACT OF THE DISCLOSURE

A memory element having several magnetic layers superimposed in stack formation wherein each of the layers are separated from one another by non-magnetic partially electrically conductive interlayers. Thus, there is created a magnetic storer element which is largely free of wall creeping, wherein the upper field strength limit for the reversible rotation and the lower field strength limit for the coherent rotation are located close to each other.

The invention relates to a memory storer, for example, a parallel or orthogonal field storer and, in particular wherein the memory elements preferably are grouped together in a matrix built up of thin magnetic layers.

The construction of faultlessly operating memory storers of the aforementioned type has hitherto failed, among other reasons, because with the action of many subcritical impulses, which individually do not suffice for the remagnetization, in case of the so-called partial control of magnetic layers, for instance, within a matrix, the layer is nevertheless remagnetized by the "creeping" of the walls.

The present invention, therefore, has as its problem, to provide memory elements of the type mentioned at the outset, in which the "creeping" of the walls leading to a breakdown of information is largely prevented.

The invention has further as its problem, that of producing a memory element in which the lower magnetic field strength limit for the coherent rotation and the upper field strength limit for the reversible magnetization turning lie so close together that thereby a coincidentally controllable information storer can be achieved or, respectively, that the production tolerances for a linearly controlled information storer can be more easily maintained than heretofore.

Figure 3:
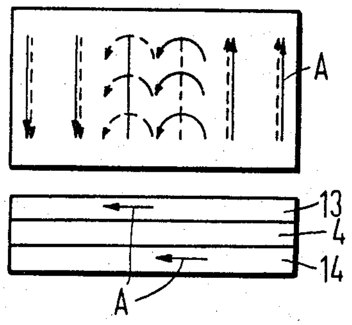
Figure 4:
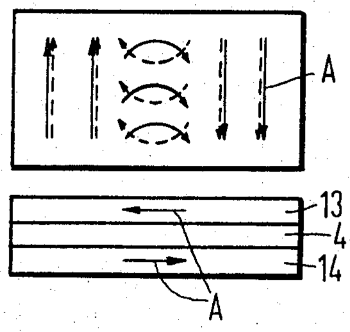
Figure 5:
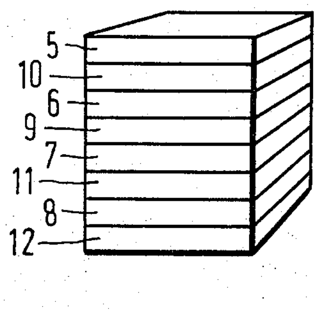

FIG. 3 schematically illustrates, in plan and elevation, a wall configuration;

FIG. 4 schematically illustrates, in plan and elevation, another wall configuration; and FIG. 5 is a perspective view in a very schematic manner, of a memory element embodying the invention.

In order to arrive at a better understanding of the invention, in the following there will be briefly explained the change-over mechanism of thin magnetic layers insofar as it is of interest within the framework of the invention, and the causes of the "wall creeping."

First of all let it be assumed that the magnetic layers are reversed in magnetization fundamentally in dependence on the strength, direction and duration of the applied external magnetic field, also termed the control field, through processes overlapping in scope, namely, for example, by the shifting of magnetic domain walls or incoherent or coherent rotating processes. What is desired is a coherent rotation of the entire magnetization of the layer as it constitutes the basis for a storer with short operating cycle.

Figure 2:
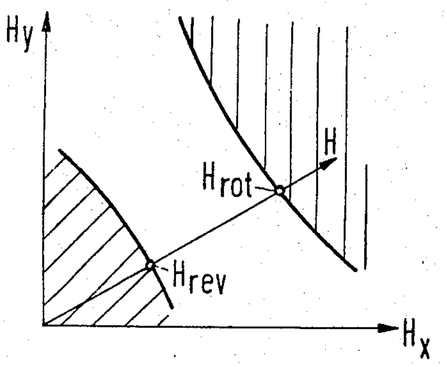
FIG. 2 is a diagram illustrating the magnetic behavior resulting from changes in the components of the magnetic control field.

With the aid of the field strength ranges schematically plotted in FIG. 2, the switch-over characteristics of a memory element built up of one thin magnetic layer can easily be derived. $H_X$ and $H_Y$ represent the components of a control field in the directions of the so-called magnetically easy and magnetically hard axes of magnetization. Upon the application of very small magnetic control fields, the magnetization of the layer is rotated out of the one of its two possible stable states, that is, out of the direction of the positive magnetically easy axis or the direction of the negative magnetically easy axis and, after the removal of the magnetic control field, returns into the starting position. The magnetization, therefore, reversibly changes. The magnetization change is always reversible if the control field lies in the area obliquely cross-hatched in FIG. 2. Now if the magnetic control field exceeds a critical magnetic field strength $H_{rev}$ dependent on the field direction, the magnetic layer is then wholly or partially remagnetized through wall movements. If, in the process, the boundary field strength $H_{rev}$ for the reversible change-over of the magnetic layers is only slightly exceeded, then on repeated control, the "creeping" of the walls occurs leading to decomposition of information. The "wall creeping" there takes place in such a direction that the domains with a magnetization parallel to the field component lying in the easy axis become greater. With the aid of observations it was ascertained that in thin magnetic layers the reasons for this so-called "wall creeping" are to be found in Bloch line displacements or 90° line displacements. The "wall creeping" there occurs even at relatively low field strengths.

For the complete change of the direction of magnetization of the layer from the one stable state into the other there is necessary in this field strength region a great number of control impulses, that is, frequent switching "on" and "off" of the magnetic control field, so that this range or region, for reasons of time and the like, cannot be utilized for information processing. Likewise, unsuitable for rapid information processing are wall movements occurring at somewhat higher field strengths and caused by large Barkhausen jumps, as well as the still relatively slow incoherent rotation of the magnetization of the layer, which likewise proceeds in this field strength region or range. It is only when the strength of the magnetic control field exceeds the range of the incoherent rotation of the magnetization and thereby a so-called boundary or limit field strength $H_{rot}$ for the range of initial coherent rotation of the magnetization of the layer, that the magnetic layer can be remagnetized within a few N sec. by the last-mentioned type of rotary processes. A coincidentally controllable memory storer, that is, a parallel or orthogonal field storer with word selection through field coincidence, in which the control field rotating the magnetization is composed of two axially parallel or axially rotated magnetic control field components, which solely do not suffice for the remagnetization of the layer, can however only be realized if the lower limit $H_{rot}$ for the coherent rotation of the magnetization of the layer, respectively, for the complete rotational switching within an adequately short time and the upper limit of the magnetic field strength for the reversible rotation $H_{rev}$ are located sufficiently close to each other.

Thus, for example, for a parallel field storer with word selection through field coincidence there is the requirement that the magnetic field strength $H_{rot}$, for the coherent rotating or for the complete rotation change-over, be smaller than twice the strength of the magnetic field strength $H_{rev}$ for the reversible rotating. This requirement is not fulfilled in the example represented in FIG. 2 as is also true in the usual memory storage elements built up of magnetic layers. The upper field strength limit $H_{rev}$ for the reversible rotation can, of course, now be increased through an increase of the crystal size in the fine-crystalline magnetic layers. This concept does not, however, lead to the fulfillment of the first-mentioned requirement since, namely, here simultaneously the magnetic field strength for the coherent turning is also increased, because the coherence of the rotating of the magnetization is also influenced by the crystal size.

For the solution of the above-cited problems the invention provides for the creation of a coincidentally controllable information storer, individual memory elements which are composed of several magnetic layers superimposed in stack formation in which system the individual magnetic layers in each case are separated from one another by non-magnetic interlayers at least partially electrically conductive.

The layer thickness of the individual layer elements is there made so thin that the critical field strength, dependent on the layer thickness, is sufficiently high for Bloch line displacements. In contrast to individual layers, here through the scatter field coupling prevailing between the superimposed wall parts, magnetized, for example, antiparallel to one another, the critical field strength for Bloch line movement is still further increased. In order to avoid the "wall creeping" it already suffices when the non-magnetic layers consists, for instance of silicon oxide or silicon dioxide.

Through the non-magnetic and electrically conductive interlayers there is transmitted between the directions of magnetization in the adjoining magnetic layers a weak exchange coupling, which has the tendency to align the magnetization in the adjoining magnetic layers parallel to one another.

In the coherent rotating of the magnetization of the layers the magnetization directions in the magnetic layers do not differ at any point of time if the magnetic layers are alike in their magnetic properties, so that the coupling does not take effect. The layer stack built up of superimposed magnetic layers therefore behaves, in the coherent rotating of the magnetization, as the sum of magnetic layers independent of one another, so that the limit field strength $H_{rot}$ for the coherent rotating or for the complete rotation change over is not affected by the stack construction method utilized or by the properties of the non-magnetic interlayers. However, matters are different as to the limit field strentgh for the reversible rotation of the magnetization $H_{rev}$.

Figure 1:
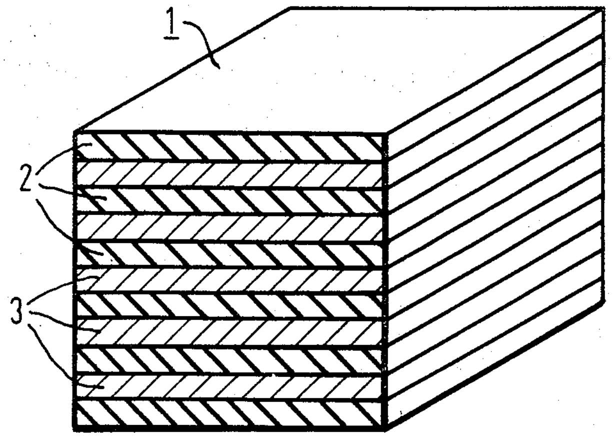
FIG. 1 illustrates a portion of a multi-layer memory element, showing the individual layers in section.

A memory element 1 built up according to the proposal of the invention is illustrated in FIG. 1. There, the non-magnetic interlayers or end layers are designated by the numeral 2 and the thin magnetic layers by the numeral 3. The effect of the coupling on the limit field strength $H_{rev}$ for the reversible rotating of the magentization is explained in the following with the example of a memory storage element built up of two superimposed magnetic layers, as illustrated in FIGS. 3 and 4. The coupling through the electrically conducting but non-magnetizable interlayer 4 results in the presence of magnetic domain walls in common only in both magnetic layers, and which can be moved only in common. The magnetostatic coupling between the superimposed walls, furthermore, results in the formation of one of the wall configurations, represented schematically in FIGS. 3 and 4 in plan and side elevation, or there may occur also walls which are composed partially of both configurations. The arrows A appearing in FIGS. 3 and 4 indicate the local magnetization directions in the two magnetic layers 13 and 14. The width of the walls and their energy depends on the strength of the indirect coupling, that is, among other things, on the thickness and the composition of the non-magnetic interlayers 4. Through the non-homogeneity of this interlayer and the coupling active through it the minimum field strength necessary for the wall movement, that is, the maximum field strength for the reversible rotating of the magnetization of the layer $H_{rev}$ is increased, without it being necessary to simiultaneously raise the limit field strength $H_{rot}$ for the coherent rotation or complete rotation of the layer.

Investigation of such member elements, built up of two magnetic layers and a non-magnetic interlayer, were carried out with interlayer materials such as gold, copper, aluminum, chromium and tin. With all these materials there was ascertained an increase of the wall movement field strength with respect to the comparative element without interlayer when the interlayer had a suitable thickness. For example, a 500 A. thick, sample 80/20 nickel-iron layer in the easy axis presented a wall displacement field strength $H_c$ of 1.1 A./cm., while an element vaporized on at the same time simultaneously of two 250 A. thick nickel-iron layers with a copper interlayer showed $H_c$=2.4 A./cm. The amount of vaporized-on copper corresponded to a copper layer thickness of about 20 A. All three layers were vaporized on at a temperature of about 200° C. and the vaporization apparatus was not ventilated between vaporizing operations. It is possible to rely on the fact that the metals successively vaporized on are partially diffused into one another, so that the interlayer will not consist of pure copper, but may consist of a copper-nickel-iron alloy (under some circumstances even slightly ferromagnetic). The field strengths $H_{rev}$ for other field directions are increased, with respect to the comparison element, by even a still greater factor, while the field strength necessary for a certain change-over speed is not increased. For a field direction in the layer plane, which forms with the easy axis an angle of 45° there was found, for an element with copper interlayer, a ratio $H_{rev}/H_{rot}$ of 0.7, while for the simple comparison layer the ratio amounted to less than 0.2. It was ascertained, moreover, that the ratio $H_{rev}/H_{rot}$ for the multiple layer depends little on the impulses used for the $H_{rev}$ measurement, while for the simple layers $H_{rev}/H_{rot}$ becomes smaller as the number of impulses, taken as a basis in the definition of $H_{rev}$, is increased.

In the elements mentioned the accidental inhomogeneity of the interlayers was exploited. Each vaporized-on layer inherently possesses a certain irregularity of the layer thickness. A further increases of the wall displacement field strength can be achieved through an inhomogeneous composition of the interlayer.

In order to achieve this, according to a further proposal of the invention, the electrically conducting non-magnetic interlayers (and possibly the separating layers) may be composed of several components, for example, in the form of a mixture of several metals with one or more insulating substances, or in the form of an alloy of several elements. The components thus put together should be relatively easily disassociated, or else the strength of the magnetic coupling should depend relatively strongly on the local composition of the interlayer.

In an example of construction embodying the invention the non-magnetic interlayer consists of a mixture of a metal with a insulating susbstance, for example, silicon monoxide. As the magnetic layer there is preferably utilized a layer consisting of a soft magnetic very nearly non-magnetostrictive alloy, as for example, permalloy. At an interlayer temperature of 200° C. this system is very nearly completely disassociated. Since the wall energy in the neighborhood of the metal is higher than in the proximity of the insulating substance, the walls will preferably remain in those regions in which the interlayer contains relatively little metal. The walls can be moved over the regions of the interlayer with higher metal constituent only by a relatively high magnetic field.

In FIG. 5 there is represented an example of an embodiment of the invention, illustrated in perspective, and in an extremely schematic manner. Reference numerals 5, 6 and 7, 8 there designate the magnetic layers, separated from one another by non-magnetic, electrically conductive interlayers 10, 11. The memory storage elements consisting of one or more groups are mounted, in superimposed relation, on a carrier body 12, for example, of insulating material or possibly of a metal conductor serving as return line of the reading line. The individual groups 5, 10, 6 and 7, 11, 8, respectively, are connected with one another over a separating layer 9, which may consist of the same material as the electrically conductive non-magnetic interlayers 10, 11. As a separating layer there may also be employed an insulating layer, for example, a silicon monoxide layer which has an insulating and smoothing effect.

Changes may be made within the scope and spirit of the appended claims which define what is believed to be new and desired to have protected by Letters Patent.

I claim:

1. A memory storage element comprising:

a plurality of thin film magnetic layers superimposed in stack formation, a non-magnetic thin film interlayer separating adjacent ones of said magnetic layers in said stack formation, each of said magnetic layers being formed of a material having a relatively weak, coercive force, and each of said thin film interlayers being sufficiently thin to permit an exchange coupling between adjacent ones of said magnetic layers.

2. A storage element in accordance with claim 1 wherein a plurality of said stack formations are superimposed and wherein an insulating layer separates each of said stack formations.

3. A memory storage element in accordance with claim 1 wherein said magnetic layers are formed of a soft magnetic alloy, very nearly free of magnetostriction.

4. A memory storage element in accordance with claim 3 wherein said soft magnetic alloy is permalloy.

5. A memory storage element in accordance with claim 4 wherein said magnetic interlayers are formed of a mixture of two different metals.

6. A memory storage element in accordance with claim 1 wherein the non-magnetic interlayers are formed of a mixture of a metal with a non-metal.

7. A memory storage element in accordance with claim 1 wherein the thickness of said interlayers is in the order of 20 A.

8. A memory storer according to claim 1 wherein the nonmagnetic interlayers are provided in the form of electrically insulating layers.

9. A memory storer according to claim 8 wherein said insulating layers are formed from silicon oxide.

10. A memory storer according to claim 8 wherein said insulating layers are formed from silicon dioxide.

11. A memory storer according to claim 1 wherein the interlayers are at least partially electrically conductive.

References Cited

UNITED STATES PATENTS

| | | | |
|---|---|---|---|
| 2,221,983 | 11/1940 | Mayer et al. | 29—195 |
| 2,920,381 | 1/1960 | Bozorth et al. | 29—196.3 |
| 3,089,228 | 5/1963 | Lynch | 29—194 |

DAVID L. RECK, *Primary Examiner.*

RICHARD O. DEAN, *Examiner.*